United States Patent

Kearney, Jr.

Patent Number: 6,007,129
Date of Patent: Dec. 28, 1999

[54] LONG HANDLED TOOL HOLDER

[76] Inventor: James Michael Kearney, Jr., 131 E. High St., Jeffersonville, Ind. 47130

[21] Appl. No.: 09/208,262

[22] Filed: Dec. 8, 1998

Related U.S. Application Data

[63] Continuation-in-part of application No. 08/987,847, Dec. 9, 1997, Pat. No. 5,887,926.

[51] Int. Cl.[6] ................................................. B60R 11/06
[52] U.S. Cl. ........................................ 296/37.6; 224/404
[58] Field of Search ............................. 296/37.1, 37.5, 296/37.6; 224/402–405; 294/142, 143, 146; 206/373; 211/70.6

[56] References Cited

U.S. PATENT DOCUMENTS

| | | | |
|---|---|---|---|
| 2,978,153 | 4/1961 | Brindle | 296/37.6 |
| 3,326,595 | 6/1967 | Ogilvie | 296/37.6 |
| 3,664,704 | 5/1972 | Ellis | 224/404 |
| 4,179,153 | 12/1979 | Cole, Jr. | 296/37.1 |
| 4,728,017 | 3/1988 | Mullican | 224/404 |
| 4,789,195 | 12/1988 | Fletcher | 296/37.6 |
| 4,911,296 | 3/1990 | Hart, Jr. | 206/373 |
| 5,588,631 | 12/1996 | Yee | 224/404 |
| 5,634,577 | 6/1997 | Pearson, Jr. et al. | 224/403 |
| 5,687,895 | 11/1997 | Allison et al. | 296/37.6 |
| 5,788,303 | 8/1998 | Chia-Hsiang | 294/143 |
| 5,848,818 | 12/1998 | Flueckinger | 296/37.6 |

FOREIGN PATENT DOCUMENTS

| | | | |
|---|---|---|---|
| 144962 | 4/1954 | Sweden | 206/373 |

*Primary Examiner*—Dean J. Kramer
*Attorney, Agent, or Firm*—Middleton & Reutlinger; John F. Salazar

[57] ABSTRACT

An apparatus for holding and restraining long handled tools is described. The tool box is comprised of a top wall, two side walls and a bottom wall within which separate compartments are formed by slidable shelves. The shelves may further compartmentalize the enclosed areas by having partitioning walls to subdivide longitudinal sections. The shelves are supported by brackets and the entire tool box rests within the bed of a truck. The tool holder is retained within the bed of the truck by attaching bolts which extend outward from the truck side wall and through the side wall of the tool box. The tool box may also rest upon the wheel well of the truck in the truck bed to provide further support.

8 Claims, 6 Drawing Sheets

LONG HANDLED TOOL HOLDER

This application is a continuation in part of application Ser. No. 08/987,847 filed Dec. 9, 1997 now U.S. Pat. No. 5,887,926.

BACKGROUND OF THE INVENTION

1. Field of the Invention

The present invention relates to an apparatus for holding and retaining tools which have a long handle and more importantly to separate such tools while also keeping them firmly in place in a relatively small area.

2. Discussion of the Prior Art

In general, long handle tools such as shovels, rakes and the like have been difficult to retain in their proper place and also separate due to the extended length of the tool handle. Without separation of the tools, the handles may become entangled in various other items or may be scratched or marked or even possibly broken due to the lack of retention of the tools in a specified location. Additionally, as these tools are often placed in the bed of a truck, the likelihood of movement of the tools while the vehicle is in motion is high due to accelerating, turning and stopping of the vehicle.

No prior art devices adequately separates such long handle tools to prevent such movement and possible damage to the tools themselves or to the carrier or vehicle within which they are found. U.S. Pat. No. 4,531,774 teaches a truck toolbox anchor assembly wherein a toolbox is fastened directly to the bed wall of the truck, said toolbox fastened perpendicular to the truck bed walls. However, due to the short length of such toolbox, long handle tools commonly found will not fit in such a toolbox. As a result, such a toolbox which retains these long handle tools is desired to prevent the movement of the tools within a truck bed or similar carrying area.

SUMMARY OF THE INVENTION

To resolve this problem, a long handle tool holding device is described herein which retains such long handle tools and adequately separates them for retention in a specified location, the entire tool holder of which may be placed and securely retained in the bed of a truck.

Accordingly, it is the main object of the present invention to provide a toolbox or other holding device for tools which have an extended length handle and to keep these tools in a small confined space.

It is another object of the present invention to provide a long handle toolbox which will adequately retain long handle tools and separate such tools to prevent the damaging thereof.

It is a further object of the present invention to provide a long handle toolbox which has varying sized retaining areas for tools with larger diameter handles or other tools which have devices attached to the handles.

It is a further object of the present invention to provide a long handled toolbox holder which itself is securely affixed to the interior side wall of the bed of a truck such that the tool holder may be removed from the bed of the truck but that when it is installed, it is unlikely to shift about or move within the bed of the truck.

In accordance with a major feature of the present invention, there is provided, in combination with a vehicle, such as a truck, having a bed, a structure for a long handle toolbox or retaining holder comprising: a plurality of longitudinally extending cylinders; means to retain said cylinders in adjacent relationship; means for retaining the long handled tool holder within the bed of the truck so that the tool holder does not move if the vehicle is in motion thereby also securing the tools held therein. Further, the present invention comprises a rigid toolbox for retaining tools with long handles, comprising: an outer wall enclosing a defined space and receiving long handled, said outer wall removably attached to the side wall of a truck. Additionally, the toolbox described above wherein the outer wall of the tool box is comprised of a top wall, a bottom wall and first and second side walls and wherein said first side wall is removably attached to the side wall of the truck. Lastly, the toolbox of the present invention wherein the truck side wall has a plurality of bolts extending outward therefrom, the side wall of the tool box having a matching plurality of apertures for receiving the bolts in order to make the tool box of the present invention removably attached to the truck.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
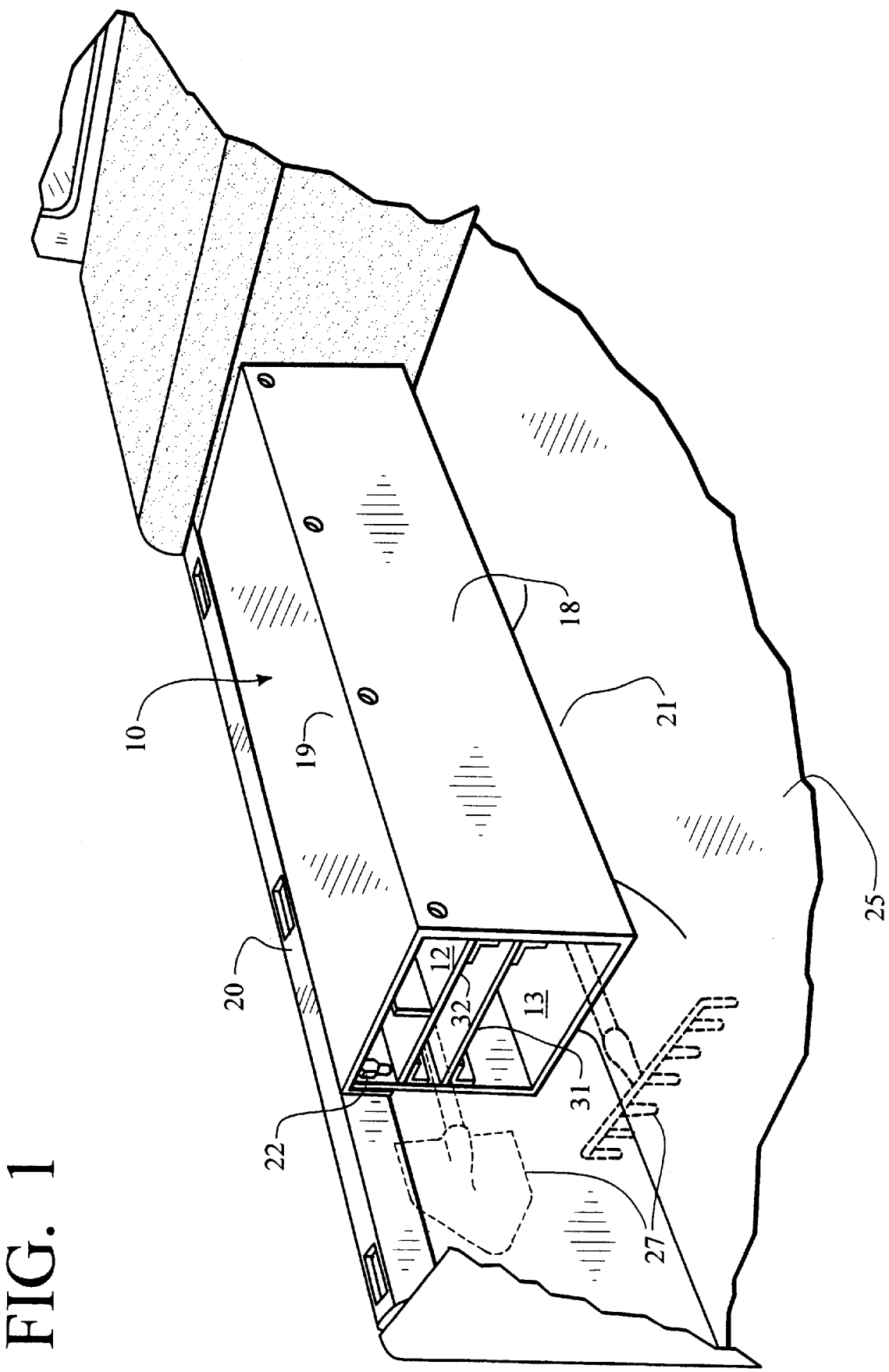
FIG. 1 is a perspective view of the long handled tool holder of the present invention.

The tool holder 10 for long handle tools 27 is shown in FIG. 1 located in the bed of truck 25. The holder 10 for long handled tools is comprised of outer walls 18, 19, 11 and 14. A plurality of compartments or enclosed areas 12 and 13 is formed within the tool holder 10 and is defined by the above referenced four walls in addition to shelves 31 and 32 inserted and retained within the walls 18, 19, 11 and 14. As shown in FIG. 1, compartments 12 and 13 are separate individual areas for retaining long handled tools 27 and allowing said tools 27 to be kept apart from one another. The compartments 12 and 13 are configured by insertion of shelves 31 and 32 within the holder 10. The benefit of having areas 12 and 13 as is shown in FIG. 1 is that the user may make his or her own configuration of long handle tool holder 10 given his or her own specific needs.

As shown in the embodiment of FIG. 1, the outer walls 11, 14, 18 and 19 of the tool holder 10 confines a space within which compartments 12 and 13 may be defined. Top wall 19 and side wall 18 are shown in FIG. 1 while the bottom wall 14 and the second side wall 11 may be seen in FIG. 4. In the present embodiment four exterior walls are shown but in fact, any external wall construction may be employed in order to enclose are area within which shelves or tools may be inserted. This includes an oval, triangular or rectangular outer wall. The tool holder 10 of the present invention is attached to the bed 25 of a truck along the truck side wall 20 and rests above the wheel well 21 of the truck as is shown in FIG. 1. Side wall 20 of the truck may be more readily seen from the alternative embodiment shown in FIG. 5.

Shelves 31 and 32 define the plurality of compartments 12 and 13 of the tool holder 10 and may be readily removed from the interior of the tool holder 10 so as to reconfigure the compartments 12 and 13. Only two of the compartments 12 and 13 are referenced but in actuality, four compartments are shown in this embodiment and more may be defined depending on the shelves utilized. Shelves 31 and 32 extend along the longitudinal axis of the tool box 10 such that they extend from one end to the opposite end in order to retain tools therein. Shelves 31 and 32 rest upon L-shaped brackets 16 and 16a, shown in FIG. 4, which are attached to side walls 18 and 11. L-shaped brackets 16 and 16a may extend the length of the tool holder 10 and do not necessarily require an L-shape as is shown. A small inwardly extending lip may also suffice to support the shelves 31 and 32. Shelves 31 and 32 may be standard lengthwise shelves without any partitioning wall 35 or may include such a wall in order to subdivide the lengthwise compartment 13 into smaller compartments 12. Partitioning wall 35 may extend upward as is shown in FIG. 1 or may likewise extend downward such that separate lengthwise compartments may be made on any levels of the holder 10. By varying the placement of brackets 16 and 16a on side walls 11 and 18, shorter or larger compartments may be designed as is shown in the drawings.

Figure 3:
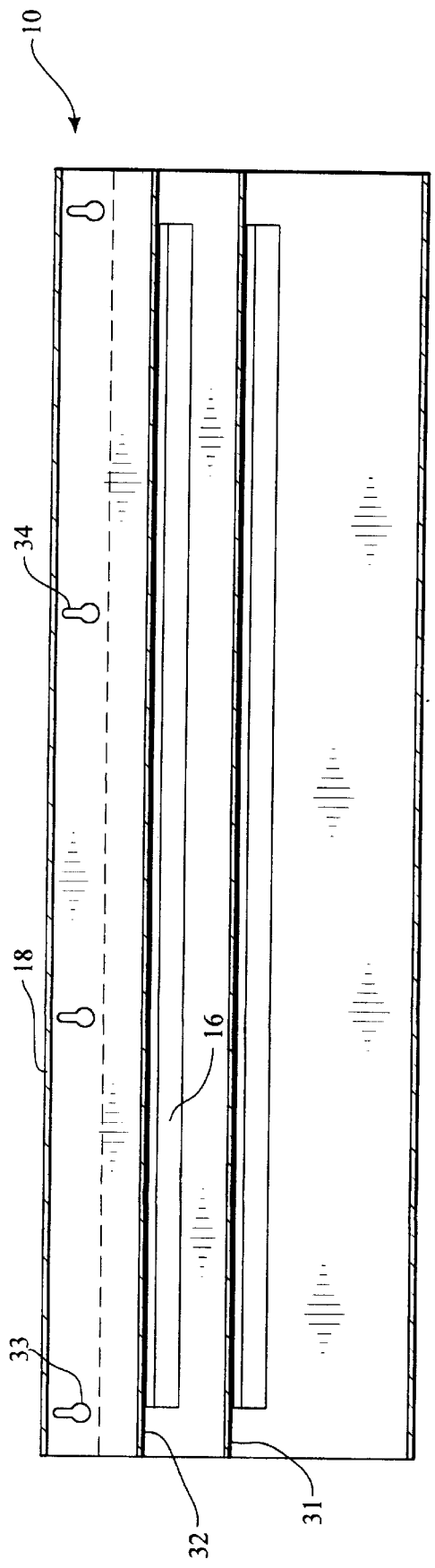
FIG. 3 is a right side sectional view of the tool holder shown in FIG. 1.

Walls 11, 14, 18 and 19 may be made of aluminum or other metal or may be made of a hardened plastic material. Also, shelves likewise may be comprised of an aluminum or plastic material for ease of handling, insertion and removal. As seen in FIG. 3, the shelves rest upon the brackets 16 and extend the length of the tool holder 10. Shelves 31 and 32 may be removed or rearranged by pulling the shelves directly out of the interior of the tool holder 10.

Figure 2:
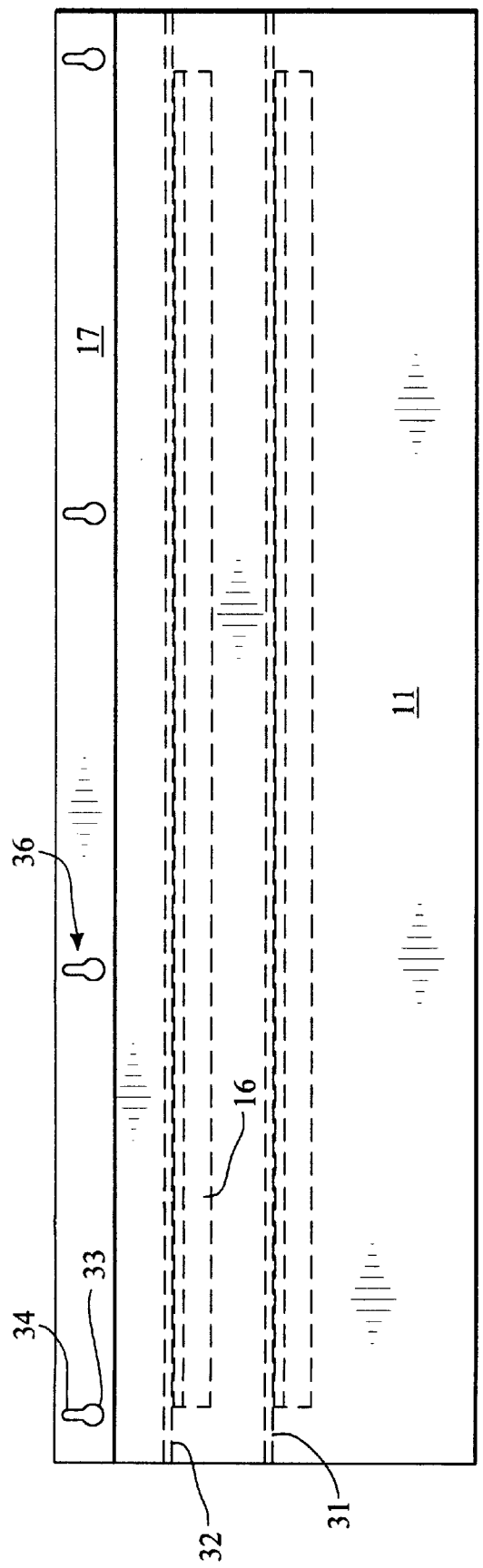
FIG. 2 is a left side view of the tool holder shown in FIG. 1.
Figure 4:
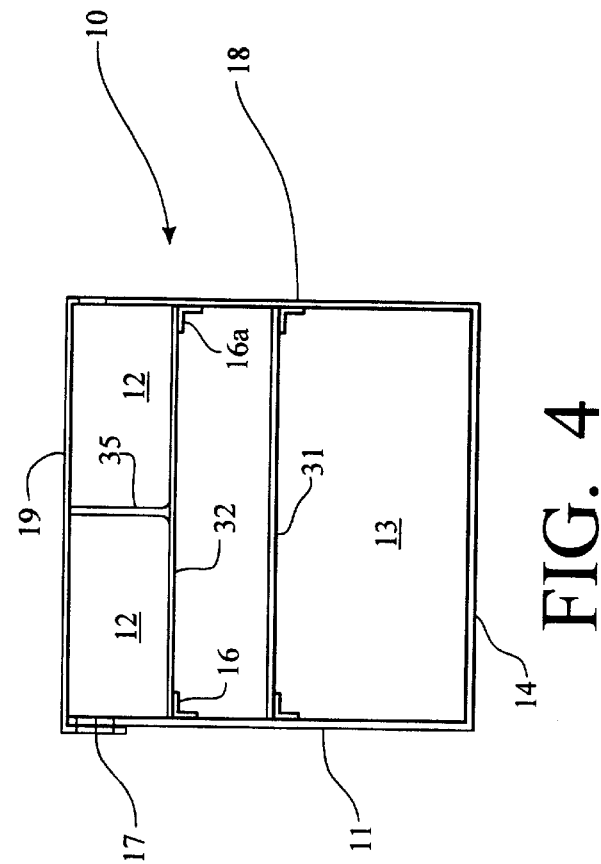
FIG. 4 is an end view of a holder for long handle tools of the present invention shown in FIG. 1.

As shown in FIG. 2, the plurality of tear drop shaped ovals 36 are formed from a narrow upper portion 34 and a wider lower oval portion 33. In this embodiment four ovals 36 are provided along the upper edge of side wall 11. Ovals 36 allow bolts 22, extending outward from the sidewall 20 of the truck, to be inserted through the lower wider portion 33 and then tightened around narrow upper portion 34 as the tool holder 10 is lowered into position. Bolts 22 may therefore be positioned on the sidewall 22 of the truck allowing the tool holder to be easily attached into the bed 25 of the truck. Bolts 22 may be standard threaded bolts or may be pins or other hanging means which allow the tool box 10 to be hung into place along the side wall 20 of the truck. The bolts 22, when utilizing threaded bolts, may also be tightened down after installation of the tool holder in order to further secure the sidewall 11 of the tool holder 10 against the sidewall 22 of the truck. Additionally, as is shown in FIG. 4, top wall 19 wraps around the upper edge of the sidewall 11 to form a double walled area 17 through which the bolts 22 extend. This provides additional support for the tool holder at the point of attachment to the truck.

Figure 5:
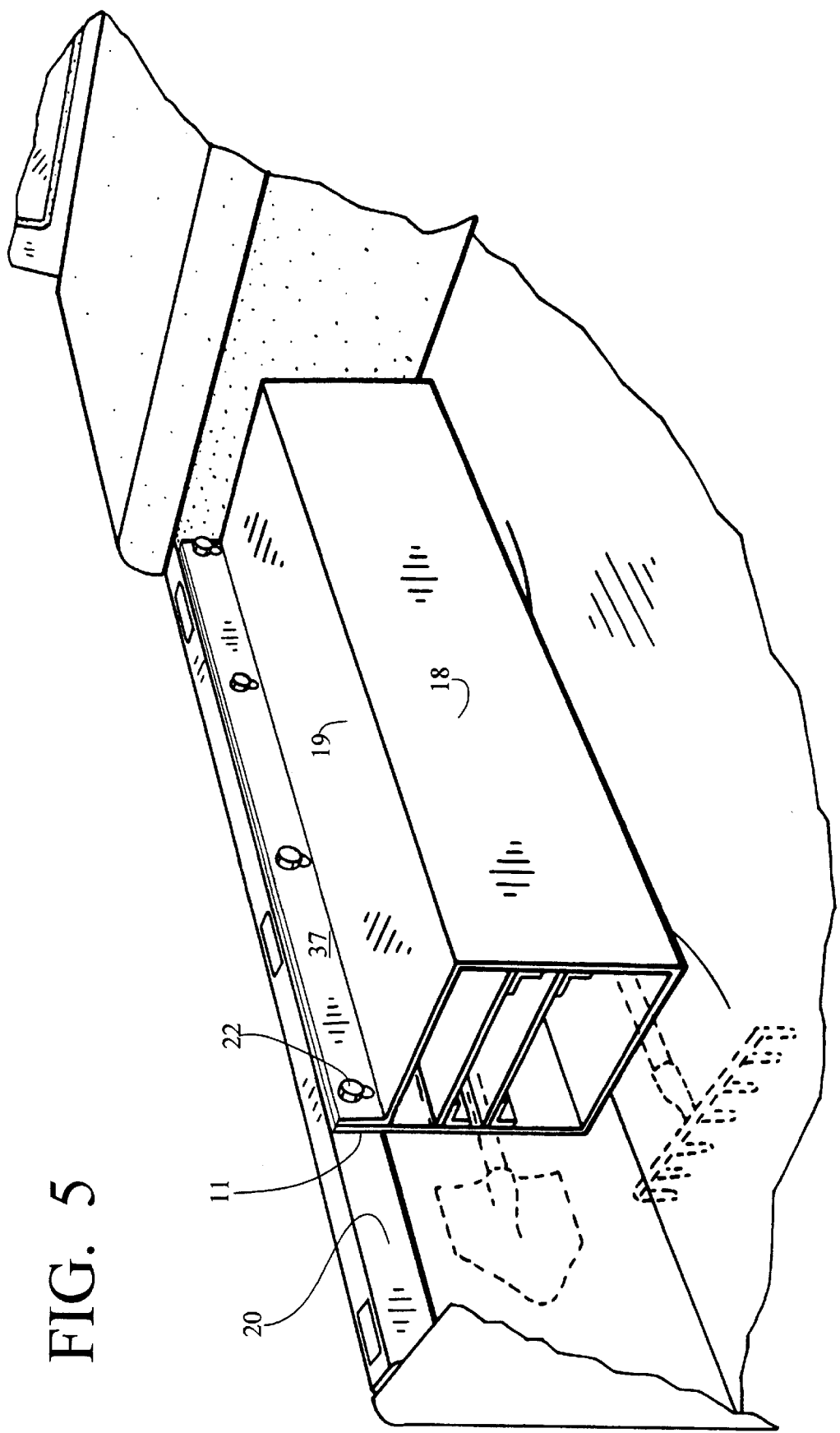
FIG. 5 is a perspective view of an alternative embodiment of the long handled tool holder of the present invention.
Figure 6:
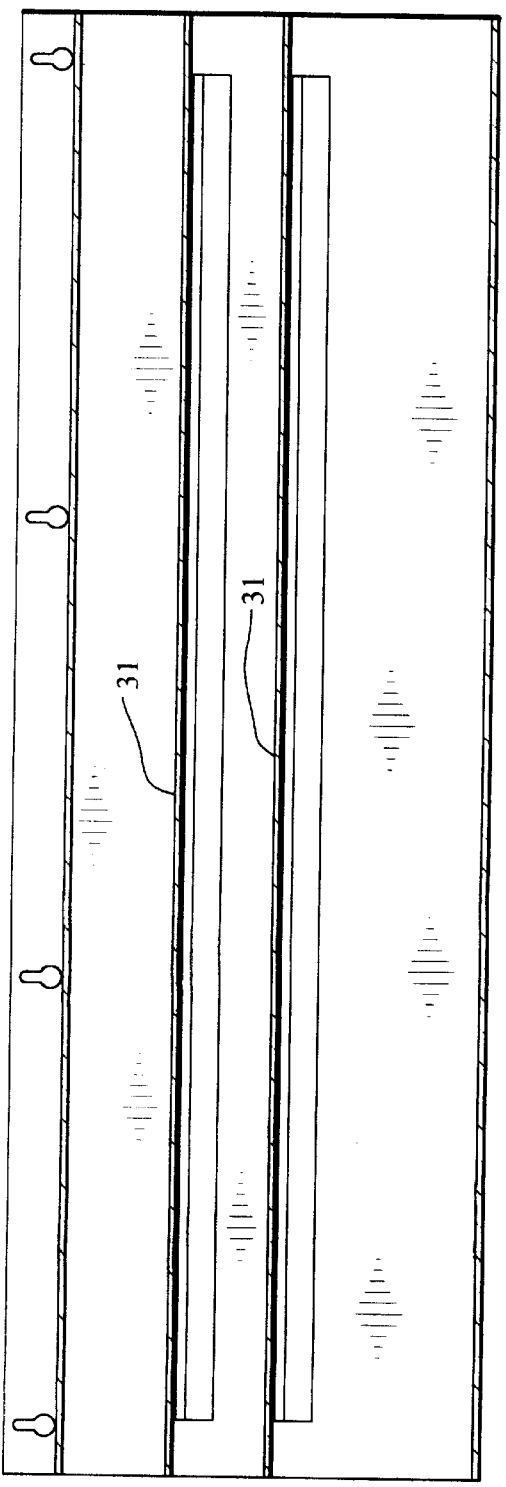
FIG. 6 is a left side view of the tool holder shown in FIG. 5.
Figure 7:
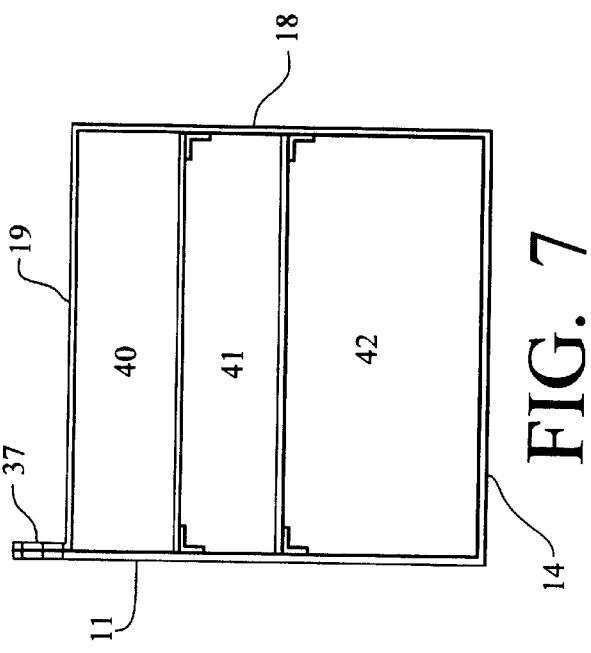
FIG. 7 is a end view view of the tool holder shown in FIG. 5.
Figure 8:
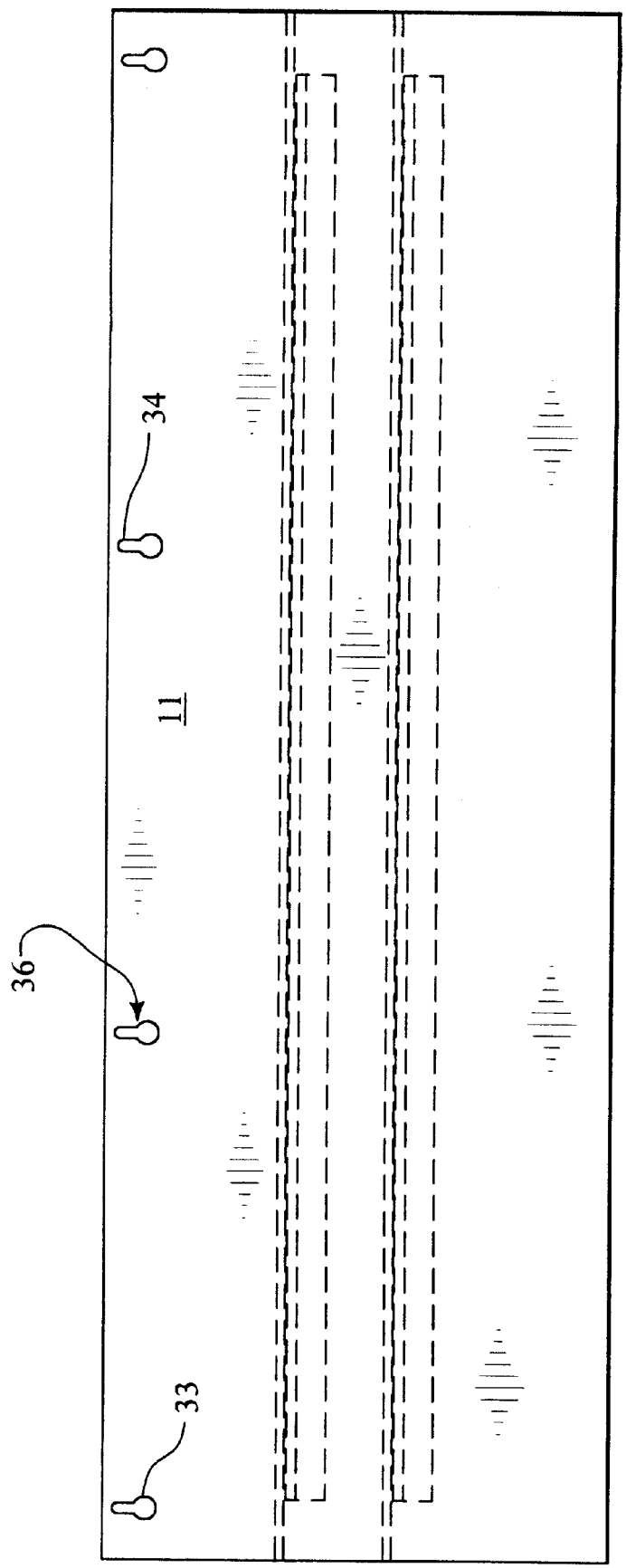
FIG. 8 is an right side sectional view of a holder for long handle tools of the present invention shown in FIG. 5.

A further embodiment of the tool holder 10 of the present invention is shown in FIG. 5 wherein wall extension 37 extends upwards from the top wall 19. Side wall 11 additionally extends upwards past the top wall 19 to place a back to back double thick section of wall extension 37 and side wall 11 are attached to the side wall 20 of the truck. A plurality of bolts 22 extend outward from truck side wall 20 and through the holes 36 formed in tool holder side wall 11, shown in FIG. 8. As with the first embodiment, the apertures 36 are formed with widened oval lower sections 33 and narrower upper portions 34 so that the tool holder 10 is securely attached to the truck side wall 22. Also, as shown in FIG. 7, the double thick section of the mating sections of wall 11 and extension 37 provides ample support of the tool holder above the tool holder 10 and also ensures that the bolts are readily accessible as is shown in FIG. 5. In this manner, the tool holder 10 may be installed and the plurality of bolts 22 may be tightened down as necessary. As shown in FIG. 6 and FIG. 7, identical shelves 31 are utilized to form only three compartments 40, 41 and 42 within the tool box 10.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

I claim:

1. A toolbox for retaining long handled tools, comprising:

an outer wall enclosing a defined space and receiving long handled tools;

said outer wall removably attached to the interior side wall of a truck and comprised of a top wall, a bottom wall and first and second side walls;

said defined space adapted to receive the handles of said long handled tools within an open end thereof;

said toolbox further comprising in the interior thereof a first surface on said first side wall and a second surface on said second side wall, said first and second surface opposing each other on opposite side walls, said first and second surfaces within said defined space, said defined space extending substantially the entire longitudinal axis of said toolbox.

2. The toolbox of claim 1 wherein said first and second surfaces are comprised of the upper exposed surface of an L-shaped brackets extending substantially along the length of said toolbox, the adjacent perpendicular surface of each of said L-shaped bracket securely affixed to said opposing side wall of said toolbox.

3. The toolbox of claim 2 wherein a shelf rests upon said first and said second L-shaped brackets.

4. The toolbox of claim 3 wherein said shelf is a horizontal shelf which extends along the longitudinal axis of the toolbox.

5. The toolbox of claim 3 wherein said shelf has a vertical divider wall extending along the length of the shelf.

6. A toolbox for retaining long handled tools, comprising:

an outer wall enclosing a defined space and receiving long handled tools;

said outer wall removably attached to the interior side wall of a truck and comprised of a top wall, a bottom wall and first and second side walls;

said defined space adapted to receive the handles of said long handled tools within an open end thereof;

wherein said first side wall is removably attached to said side wall of said truck;

wherein said first side wall is adjacent said side wall of said truck and further wherein said first side wall extends upward beyond said top of said toolbox and wherein said top wall of said toolbox has an upwardly extending extension adjacent said portion of said first side wall extending beyond said top wall.

7. The toolbox of claim 6 wherein said first side wall and said upwardly extending extension of said top wall have a plurality of apertures for receiving hanging means extending outward from said truck side wall.

8. A toolbox for receiving the handles of long handled tools, comprising:

a top wall, a bottom wall and a first and second side wall, said first side wall removably attached to an interior side wall of a truck bed;

a plurality of compartments formed within said walls and extending along the entire longitudinal axis of said toolbox, said plurality of compartments dividing said toolbox up and open on one end of said toolbox to receive said handles of said tools;

wherein said side wall of said truck bed has a plurality of bolts extending outward therefrom which are received within a matching plurality of apertures formed in said first side wall of said tool box to removably retain said toolbox on said side wall of said truck.

* * * * *